United States Patent [19]

Thoma et al.

[11] 4,265,117
[45] May 5, 1981

[54] SURFACE TEMPERATURE DETECTING APPARATUS

[76] Inventors: Paul E. Thoma, 208 Grove St., Burlington, Wis. 53105; Louis J. Crum, 6277 W. Port Ave.; Ronald J. Frias, 6282 W. Port Ave., both of Milwaukee, Wis. 53223

[21] Appl. No.: 6,864

[22] Filed: Jan. 26, 1979

[51] Int. Cl.² .......................... G01K 7/04; G01K 7/16
[52] U.S. Cl. ........................ 73/359 R; 73/362AR; 73/362 SC; 136/221; 136/229; 136/230; 338/28
[58] Field of Search ....... 73/359 R, 362 AR, 362 SC, 73/359 A; 338/28, 29, 22 A, 225 D, 23; 136/221, 229, 230

[56] References Cited

U.S. PATENT DOCUMENTS

| | | | |
|---|---|---|---|
| 2,703,833 | 3/1955 | Vanvor | 338/28 |
| 3,268,844 | 8/1966 | Bergsma | 338/28 |

*Primary Examiner*—Donald Watkins
*Assistant Examiner*—Denis E. Corr
*Attorney, Agent, or Firm*—Andrus, Sceales, Starke & Sawall

[57] ABSTRACT

A temperature sensor is fixedly attached to a thin, flexible disc-like metal plate with sufficient flexibility to conform to the general shape of a surface. The sensor may be thermocouple, a resistor, a semiconductor or other structure. This thin metal member has a low thermal capacity or mass and a relatively high degree of thermal conductance. A tubular insulating and elastic member is fixedly attached to the periphery of the plate and to a tubular housing having an attached handle. The housing functions as a support and an enclosure for the temperature sensitive unit, flexible connecting leads and the like. The elastic member permits the plate to pivot about the housing to move into complete surface engagement with the surface being monitored. The electrical wires connected to the temperature sensitive unit are relatively fine to minimize the thermal mass and capacity added to the unit. The wires are also flexible such that they do not interfere with movement of the plate. An elastic material covers the wire attachment and a short distance therefrom to relieve stress resulting from flexing of the leads. A suitable insulation covers exposed conducting surfaces to minimize creation of a spurious conducting path in the presence of condensed liquids.

16 Claims, 4 Drawing Figures

SURFACE TEMPERATURE DETECTING APPARATUS

BACKGROUND OF THE INVENTION

The present invention relates to a temperature sensing apparatus and particularly to such an apparatus which is adapted for sensing surface temperature of another structure.

Temperature sensing and control systems may employ a variety of electrically based transducers. Generally, available transducers incorporate resistance sensitive elements, thermocouple elements or semi-conductor elements, all of which produce a change in electrical characteristic in response to a sensed temperature change. A readout device, such as a digital reading thermometer, provides accurate conversion of the signal from the sensor apparatus. In those applications where the transducer is immersed within the media which changes in temperature, temperature-related-output can be obtained with a high degree of accuracy. For surface temperature measurement, the sensor is constructed to respond to an engagement of the transducer with the surface. With existing devices, however, significant difficulties have been encountered in obtaining an accurate detection of surface temperatures. Various factors contribute to the inaccuracies in the results. Some of the most significant factors include poor thermal contact between the sensor element and the surface, thermal non-equilibrium between the sensor element and the surface, unacceptable levels of heat extraction by the sensor or surface from the opposite member, and finally thermal radiation within the sensor unit, as such. Generally, the inaccuracies associated with prior art contact surface measurement devices are related to the design and construction of the sensor apparatus, as such, including the physical construction as well as the response materials or elements and their support or mounting. For example, unless the configuration of the sensing element and the surface to be measured are the same, appropriate contact or engagement will probably not be obtained. The thermal capacity, mass and transfer characteristics of the sensor unit, associated coupling elements or mediums for establishing engagement with the surface may, of course, significantly effect the accuracy of the readout. Thus excessive mass, a low coefficient of thermal conductivity and the like will normally introduce inaccuracies into the response characteristic and readout.

SUMMARY OF THE PRESENT INVENTION

The present invention is particularly directed to a temperature sensitive transducer apparatus constructed to provide accurate, reliable and repeatable response to surface temperature measurement with the sensing means adapted to a wide variety of surface materials, texture and geometric configurations. Generally, in accordance with the teaching of the present invention, the sensing means includes a sensor support member defining an extended surface engaging face means which is secured to a support assembly by a thermal insulating and elastic connecting member. A temperature responsive means is secured to the support member and connected by flexible wiring to an output circuit. The flexible wiring is of material having high electrical conductance and low heat transfer. The support member is formed as a flexible member which conforms readily to different configurations. The support member is further formed of material having a low thermal mass and a high thermal transfer characteristic. Thus, the low thermal mass is required to minimize the influence on the thermal characteristic or status of the surface being measured. The high thermal conductivity, is of course, required to provide the rapid transfer of the surface temperature to the sensitive element. The characteristics of the structure including the mounting member, of course, must have appropriate strength and corrosion resistance for the desired applications. Such a device can be readily constructed in accordance with the teaching of the present invention to accurately detect the temperature of a surface. Such a unit may also be immersed in a fluid medium for detecting its temperature with the same degree of response.

More particularly in accordance with a preferred and particularly unique embodiment of the present invention, an appropriate temperature sensitive unit is fixedly attached to the back-side of a flexible disc-like support member, such as a thin metal plate with sufficient flexibility to conform to the general shape of the surface, the temperature of which is being monitored, without creation of undue application forces. The sensitive unit may be a thermocouple, a resistor, a semiconductor or other structure which produces a detectible electrical change in response to a change in temperature and which is adapted to be intimately bonded and fixed to the support member. The thin metal member has a low thermal capacity or mass and a relatively high degree of thermal conductance to rapidly transfer the thermal characteristic from the surface means being measured. In addition, the electrical leads connected to the temperature sensitive unit are relatively fine to minimize the thermal mass and capacity added to the unit. Further, the wires are flexible such that they do not interfere with movement of the mounting member for optimum coupling to various surface configurations. An annular or ring shaped elastic member is fixedly attached to the periphery of the disc-like element. The elastic member is secured to the end of an appropriate tubular housing which functions as a support and an enclosure for the temperature sensitive unit, the flexible leads and the like.

The movement of the support member may create certain flexing characteristics at the point of attachment of the leads. An elastic encapsulating material may advantageously be placed over the point of attachment and a short distance therefrom. The elastic material acts as a strain relief medium. In another aspect of the invention, the exposed conducting surfaces may be coated with a suitable insulating material to minimize creation of a spurious conducting path in the presence of condensed liquid in a humid environment or surface being measure.

On highly satisfactory temperature sensitive unit which may be used in a thin film-like temperature sensitive metal grid laminated on both sides with plastic. The unit when bonded to the metal mounting disc will flex when conforming to surface shape, with possible creation of stress and strain within the unit. An overlay or backing member of a material corresponding to that of the support member is advantageously secured to the back side of the unit. The backing plate element will minimize tensile and compressive stresses within the film-type sensing components as a result of the flexing mounting member.

The present invention particularly provides a significant improvement in the art of surface temperature detectors.

BRIEF DESCRIPTION OF DRAWINGS

The drawings furnished herewith illustrates a preferred construction of the present invention in which the above advantages and features are clearly disclosed as well as others which will be readily understood from the following description.

In the drawings.

DESCRIPTION OF ILLUSTRATED EMBODIMENTS

Figure 1:
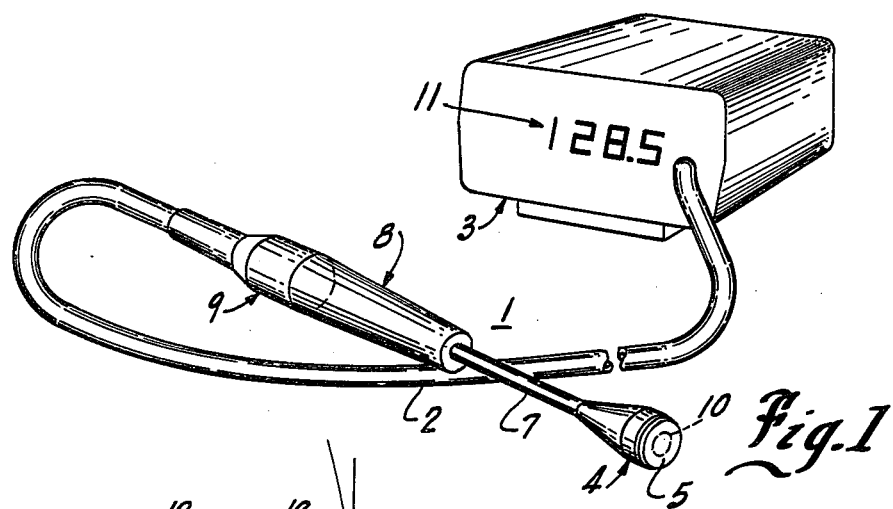
FIG. 1 is a pictorial view of a temperature sensing instrument including a temperature sensing probe illustrating one embodiment of the invention.

Referring to the drawings and particularly to FIG. 1 a surface temperature sensing probe 1, constructed in accordance with the teaching of the present invention, is illustrated connected by a suitable output cable 2 to a digital read-out unit 3 to form a digital thermometer. The present invention is particularly directed to the construction of the sensing probe 1 which in the illustrated embodiment of the invention includes a sensing head 4 having an outer flat surface 5 adapted to be located in engagement with a surface 6, the temperature of which is to be detected or monitored. The sensing head 1 is connected by a supporting tube or member 7 to a manipulating handle 8. The handle 8 in turn is provided with a conventional or any other suitable connector 9 for releasable engagement with a mating connector on the connecting cable. The digital read-out unit 3 will normally be employed with various forms of probes and the releaseable connector 9 permits connection to an available digital read-out device.

A temperature sensor 10 is mounted within the head 4 and produces an electrical signal in accordance with the temperature. The sensor 10 is connected by suitable leads which extend through the support tube 7 and handle 8 as more fully developed hereinafter, and provides for transmission of the signal to the digital read-out unit 3 to provide a visual indication 11 of the surface temperature.

Figure 2:
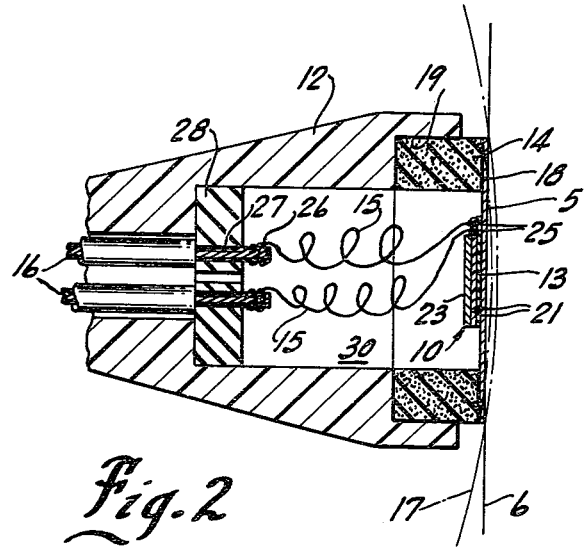
FIG. 2 is an enlarged vertical section through a sensing head portion of the sensing probe shown in FIG. 1.

In the illustrated embodiment of FIGS. 1 and 2, the probe 1 includes an outer housing 12 which is secured to the outer end of the tube 7 in any suitable manner. A disc-like support member 13 is secured to the outer end of the housing 12 by an elastic member 14 to effectively seal the housing and locate the disc-like member in outwardly spaced relation to the support housing 12. The elastic member 14 allows movement of the support member 13 relative to the housing 12. Temperature sensitive sensor 10 is secured in intimate contact to the inner face of the disc member 13 and connected to output wire 15 which extend outwardly through the housing 12. Wires 15 are connected to insulated leads 16 which extend through the tube 7 and handle 8 to the connector 9.

The several elements of the head are selected and constructed in accordance with the teaching of the present invention to provide a reliable, accurate and repeatable sensing of the surface temperature. Referring particularly to FIG. 2, the support member 13 is illustrated as a relatively thin metal disc-like plate with the temperature sensor 10 attached to the backside thereof. The plate 13 thus provides for coupling of the sensor to the surface being measured. This disc-like plate 13 is specially constructed to have a high degree of flexibility and thereby permits conforming of the member to the general shape of the surface being measured. For example, in FIG. 2 the surface is shown as a flat surface 6. The disc-like plate conveniently abuts such a flat surface. However, in many instances the surface may not be flat, but rather some other configurations such as a crowned surface as shown at 17 in phantom in FIG. 2. The disc-like plate 13 generally conforms to such surface and maintains appropriate contact between the member 13 and the surface. The thin, flexible disc plate 13 is formed of a material having a low thermal capacity and mass, and also a relatively high thermal conductivity, such that it has minimal influence on the thermal status of the surface. Thus, the plate 13 will not significantly change the temperature of the surface as a result of being placed in contact therewith in the equilibrium state. The thermal conductivity of plate 13, of course, is high to rapidly transfer the surface temperature directly to the sensor element 10 and thereby produce equilibrium conditions relatively rapidly.

Further, as noted previously, the sensor is fixedly secured to the back side of the disc-like plate, and particularly to the central portion. The outer edge of plate 13 is secured to the elastic member 14.

A typical and highly satisfactory material which has been employed as a support member 13 in the several of the embodiments of the invention described herein is a spring tempered stainless steel. A typical dimension of the plate is a round disc having a diameter of 0.7 inch and a thickness of 0.003 inch.

The periphery of the disc 13 is bonded to the elastic mounting member 14 defining an inner free surface to which the sensor 10 is intimately and fixedly attached.

In the illustrated embodiment of the invention the elastic member 14 is illustrated as an annular or tubular ring member having the outer surface abutting the back side of the plate 13 and particularly the outer peripheral portion thereof. An adhesive 18 fixedly bonds the elastic member to the plate 13. The elastic member 14 projects axially from the disc with the opposite end telescoped into a recess 19 in the end of the housing to support the plate 13 in outwardly spaced relation to the housing 12 and with a portion of the elastic member 14 producing from the housing 12 to provide a flexible and elastic support of the flexible support member 13. The elastic member 14 is also adhesively bonded within the recess 19. The material of member 14 is selected to also have a high thermal insulating characteristic in addition to its elastic characteristic. The material selected and the construction of the elastic member is such therefore that it will not significantly influence the temperature of the surface being measured and/or the temperature of the sensing or the mounting member. Thus, member 14 also functions to maintain a high degree of thermal separation between the sensor support member 13 and interconnected sensor 10 from the housing 12. The members 13 and 14 with housing 12 maintain a complete enclosure of the sensor 10 and internal wiring from the adjacent environment. This will minimize the introduction of air and thereby minimize the difference in the air temperature from the surface temperature. The member 14 further provides a stable structural support for support member 13 and protective enclosure of the sensor 10 and leads 15 as well as contributing to the conformal bending of the disc-like plate 13 to the surface 6 being measured. Thus, if the sensing probe 1 is not placed into abutting engagement with the head 4 perpendicular to the surface 6, the projecting elastic member 14 allows the disc-like plate 5 to pivot about the housing and thus handle 8 and tube 7 into firm abutting engagement with the flat surface.

The thermal insulating and elastic member can, of course, be of any suitable material, or of any other suitable construction providing the functioning as described above. A typical elastic material which is suitable for the embodiment of FIG. 2 is a medium density closed cell silicone sponge rubber which is commercially available. Such a material can be readily secured to the plate 13 and to the housing 12 by means of room temperature vulcanizing silicone rubber.

The sensor 10 is secured to the back side of the support member 13 as previously noted within the elastic member 14 which provides a protective enclosure about such sensor and the output interconnection thereof.

Figure 3:
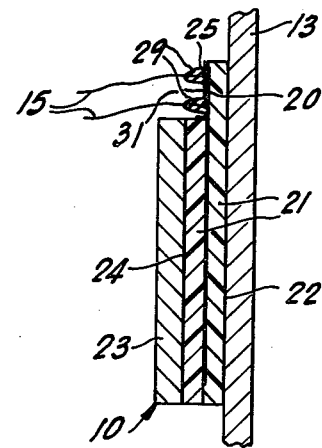
FIG. 3 is an enlarged fragment or view of FIG. 2.

In the embodiment of FIGS. 1-3 a grid film type sensor is illustrated. Sensor 10 may include a nickel grid 20 which is embedded between a pair of superposed polyimide film 21 to define a thin flat temperature sensor. The film-like sensor is readily bonded to the back surface of the support member 13, for example, by use of a suitable adhesive 22. For example, a low viscosity Epoxy adhesive 22, which is readily commercially available, will be readily recognized by those skilled in the art as an appropriate means for providing effectively bond of the polyimide film to a stainless steel disc. This material, as well as many others can be employed to provide a strong and permanent bond of the film type unit without interference with the rapid and affective transfer of heat from the support member 13 directly to the sensor 10, and particularly grid 20. Further, such an adhesive bond will not appreciably add to the thermal capacity or mass of the support member and thus will not adversely effect the status of the surface being measured.

Those skilled in the art will also readily recognize the importance of maintaining the support member as small in size as practical in order to minimize the thermal mass while still maintaining adequate support and contact of the sensor to the surface 6 to effect sensing its temperature characteristics.

Although not essential, a significant improvement in the system is obtained by securing a final overlay or backing member 23 to the back side of a film-type sensor 10. The backing member 23 generally conforms to the back side of the film-type sensor member 21, and is formed of a metal generally of the same type as that used to form the support plate 13, such as stainless steel in the described embodiment. Generally member 23 should be formed of a corresponding thickness. The overlay member 23 is permanently and fixedly attached to the back side of the film-type temperature sensor 10 through use of an epoxy adhesive 24 or the like which provides a positive attachment. The overlaying member is particularly selected so that the film-type temperature sensor 10 and particularly grid 20 experiences minimum tensile and compressive stresses when the plate 13 flexes into conformal relationship to the surface. This not only eliminates adverse effects on the attachment of the sensor elements but prevents changes in the grid resistance as a result of a physical stressing thereof.

The sensor 10 relies on the change in the electrical resistance of the sensor grid 20 with temperature to produce a detectable output suitable for driving a measuring instrument such as the digital read-out thermometer, as illustrated. The sensor 10 must therefore be electrically connected to the instrument 3. In the illustrated embodiment of the invention relatively thin and flexible connecting leads 15 interconnect the sensor 10 to connecting insulated leads 16, which extend rearwardly through the tube 7 and the handle 8. The relatively small interconnecting leads 15 are selected with a low electrical resistance to permit sensing relatively small changes in the electrical characteristic of the sensor 10. The leads 15 are further selected to provide a minimal thermal capacity or mass so as not to change the themal capacity and characteristic of the sensing head significantly. For example, in a practical construction, a 36 guage copper wire having a thin electrically insulating coating was employed. The leads 15 are soldered as at 25 or otherwise connected to the resistance grid 20 and extend outwardly to a similar connection 26 to the terminal ends 27 of leads 16. The ends of the leads 16 are supported in an appropriately apertured insulating plate 28 in the base of the housing 12. Leads 15 are provided with coils or loops to permit the unrestricted movement of the support plate 13 and the sensor 10.

The connecting leads 15 can be of a relatively short length and thus maintain thermal isolation of the sensor 10 without significant insertion of resistance into the circuit. For example, a spacing on the order of one inch is readily satisfactory and practically operative. The output leads 16 may be of substantially larger wires, as illustrated.

As noted previously, the plate 13 may generally flex or pivot relative to the housing 12 in moving into conforming and abutting engagement with the surface 6. This may result in movement relative to the small connecting leads 15 which would tend to establish strain and flexing at the point of the soldered connection and a short distance therefrom. In order to avoid possible wire rupture, a suitable elastic material 19 is placed over the soldered connection 25 and a short length of wire 15. The elastic material 29 acts as a strain relief means and contributes to a long life connection. For example, a highly satisfactory elastic material which has been employed is a room temperature vulcanizing silicone rubber.

The housing 12 is generally a cup-shaped member having an outer cone-shape configuration. The cup-shaped housing is provided with a central tubular opening in the base to accomodate the outer end of the tube 7. The tube 7 and housing 12 may, of course, be integrally formed or separately formed and interconnected.

Housing 12 thus provides a slightly enlarged chamber 30 within the head portion for accommodating the sensor 10 and the interconnecting flexible leads 15.

The housing may be formed of any desired configurations to provide a basic support for the thermal insulating and elastic member 14. In the illustrated embodiment of the invention, the cup-shaped housing 12 provides means for protecting the transferring of the electrical leads from the sensor to the measuring instrument.

Finally, in an optimum and a preferred embodiment, all exposed thermal conducting surfaces from the electrical wires and sensors are eliminated by providing a thin layer of an electrically insulating material 31 over such surfaces. For example, a highly satisfactory material would be a environmental curing polyurethane formulation. Although no essential, such a coating prevents generation of spurious conducting paths in the presence of condensate on the surface being measured and on the conducting surfaces.

The illustrated probe construction also provides very convenient means to facilitate manual manipulation and placing the plate 13 in firm thermal exchange contact with the surface 6 for temperature measurement.

Thus, in use, the temperature sensing probe 1 is coupled through the connector 9 to the digital readout instrument 3. The probe plate 13 is then located in a firm abutting engagement with the surface 6 to be monitored. The temperature of the surface is readily transferred to the sensor 10 through the extended surface established by support member 13 within an equilibrium rapidly established as a result of the good surface engagement, the high thermal conductivity of such member and the low thermal mass of the associated component. As a result the electrical characteristic of the sensor grid 20 rapidly changes to that associated with the actual surface temperature. The change in electrical resistance is reflected in appropriate temperature reading 11 in instrument 3.

The sensor 10 is essentially effected only by the temperature of the surface 6 and consequently the output is an accurate, reliable and repeatable measure of surface temperature.

The elastically mounted plate readily adapts to the various surface materials, texture and geometries which are encountered in practical applications and thus provides a sensing element which can be readily adapted to various heat sensing systems and applications. In addition to the resistance type sensor shown in FIGS. 1 through 3, other sensors such as a thermocouple, a semiconductor element or the like can be used.

Figure 4:
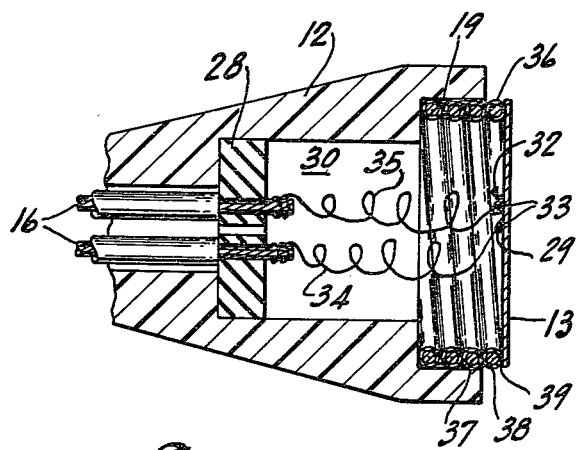
FIG. 4 is a view similar to FIG. 2 illustrating an alternate embodiment of the present invention.

In FIG. 4, an embodiment is illustrated employing a thermocouple sensor 32. The embodiment of FIG. 4 generally corresponds to that of FIGS. 1 through 3 except for the sensor 32 and the elastic mounting of the plate 13. The several common elements of FIG. 4 are referred to by the same reference numbers as in FIGS. 1 through 3 for simplicity of explanation.

Sensor 32 is bonded directly to support plate 13 by an adhesive 33 having good thermal conductivity. A typical adhesive is a lead-tin solder, but a thermocouple may be welded directly to a metal support plate. Thus, the thermocouple may consist of a pair of fine diameter thermocouple wires 34 and 35 interconnected to each other in a conventional junction or to each other through the support plate. The same wires 34 and 35 which are an integral and continuous extension of the thermocouple may form the electrical connecting wires for connection to the instrument connecting leads 16 and in any event should be of corresponding composition. Wires 34 and 35 are insulated to prevent shorting of the thermocouple junction. A stress release elastic material 29 may cover the thermocouple 32 and the integral connections generally as in the previous embodiment.

In FIG. 4, the elastic mounting member 36 for support of plate 13 is a cylindrical member formed of a coil spring 37 covered by a suitable rubber-like covering 38. The elastic mounting member 36 may of course be as in the first embodiment or of any other suitable and similarly functioning structure. The inner end of the member 36 is secured within the recess 19 of cupchaped housing 12. The outer end of member 36 is provided with an integral flange 39 which is secured to the outer periphery of plate 13. The spring-loaded member 36 thus functions to close the chamber 30 and thermally isolate the plate 13 and sensor 32 while permitting the flexing or pivoting of plate 13 to insure engagement over essentially the total face of plate 13.

The second embodiment will essentially function in the same manner as the first embodiment with the thermocouple providing an appropriate temperature related voltage output. The measuring instrument is selected to respond to the thermocouple voltage. The embodiment of the invention shown in FIG. 4 otherwise essentially corresponds in function to that of FIGS. 1 through 3 and no further description thereof is given.

Although the sensing head is constructed to uniquely adapt the unit to surface temperature measurement, the head may be immersed in a suitable fluid to provide an output directly related to the temperature of the medium.

Further, the probe structure may be varied in accordance with any particular or desired design and component specifications. For example, although the sensitive element is shown as a separately attached element to the support member, an integral structure may function in the same manner. The support assembly need not be closed and of course any desired shape and configuration can employ one or more of the several unique aspects of the invention as described heretofore.

Various modes in carrying out the invention are contemplated as being within the scope of the following claims, particularly pointing out and distinctly claiming the subject matter which is regarded as the invention.

We claim:

1. A temperature sensing apparatus for detecting the temperature of a surface, including a temperature sensitive sensor means having a support member with an extended surface engaging face means, said support member being a flexible member moveable into general conformance to the configuration of a surface to be detected, a support means for said support member, and an elastic means connected to the support member and to the support means and locating the support member spaced from the support means to allow elastic deflection of the support member relative to the support means.

2. The apparatus of claim 1 wherein said elastic means has a low coefficient of thermal conductivity.

3. The apparatus of claims 1, or 2 wherein flexible electrically conductive leads of a minimal cross-section are connected to the sensor means and project therefrom, and relatively heavy conductors are connected to the outer end of the flexible electrically conductive leads.

4. The apparatus of claim 1 wherein said support member is a flat, disc-like member of a thin metal having a high thermal conductance, said support means is a cup-shaped member having an outer open end, said elastic means is a tubular elastic member having an inner end secured within said open end and projecting outwardly therefrom and having an outer end fixedly attached to the outer periphery of the disc-like member to form a substantially sealed chamber between the support member and the cup-shaped member.

5. The apparatus of claim 4 wherein said elastic means includes a tubular cover of a thermal insulating material and tubular coil spring secured to the cover, the opposite ends of said cover being attached to the support means and to the support member to form a substantially sealed chamber between the support member and the cup-shaped member.

6. The apparatus of claim 1 wherein said elastic means is a tubular member formed of a rubber-like material.

7. The apparatus of claim 1 wherein said sensor means is a film-type unit having a temperature sensitive element, said support member is a plate-like member having an outer surface engaging side and a back-side, means intimately securing the film-type unit to the back-side of the plate-like member, and a plate-like backing member intimately attached to the back-side of the film-type unit, said backing member having a deflecting characteristic corresponding to that of the plate-like member.

8. A temperature sensing apparatus for detecting the temperature level of generally flat surfaces, comprising a support housing, a thin plate-like support member, said support member including a central portion having a high thermal conductance, a temperature sensor means intimately attached to the sensor portion of said support member, and an elongated tubular elastic connecting member having one end connected to the outer peripheral portion of the support member and the opposite second end connected to the housing whereby said support member is spaced from the housing and is deflectably mounted on said housing, said elastic connecting member being constructed with a minimal thermal conductivity and being essentially continuous to form a sealed chamber between the housing and the support member.

9. The apparatus of claim 8 wherein said support member is deflectible for conforming to the surface being detected.

10. The apparatus of claim 9 wherein said support member is a metal plate of a sufficient thinness to permit deflection in response to manual forcing into engagement with the surface being detected.

11. The apparatus of claim 8 wherein said sensor means is a thermocouple means attached to said plate and having connecting lead means extending through the sealed chamber.

12. The apparatus of claim 8 wherein said sensor means is a film-type unit including temperature sensitive resistance element and having connecting lead means extending through the sealed chamber.

13. The apparatus of claim 8 including highly flexible and small diameter conductive leads which are connected to the sensor means and project through said sealed chamber and the housing, relatively heavy output connecting conductors secured to the housing and connected to the outer end of the flexible conductors.

14. The apparatus of claim 13 including an elastic material secured over the connection of said leads to the sensor means and at least over a portion of the adjacent flexible leads.

15. The apparatus of claim 8 wherein said housing is a substantially closed housing and said support member and elastic member are each a continuous member to effectively isolate the sensor means from the surrounding ambient and to enclose the sensor means and the leads.

16. A temperature sensing apparatus for detecting the temperature of a surface, including a temperature sensitive sensor means having a support member with an extended surface engaging face means, a support means for said support member, and an elastic means connected to the support member and to the support means and locating the support member spaced from the support means to allow elastic deflection of the support member relative to the support means, flexible electrically conductive leads of a minimal cross-section connected to the sensor means, relatively heavy conductors connected to the outer end of the flexible conductive leads, and including an elastic material secured to the connection of leads to the sensor means and at least over a portion of the adjacent flexible leads.

* * * * *

UNITED STATES PATENT AND TRADEMARK OFFICE
CERTIFICATE OF CORRECTION

PATENT NO. : 4,265,117

DATED : May 5, 1981

INVENTOR(S) : Paul E. Thoma, Louis J. Crum & Ronald J. Frias

It is certified that error appears in the above-identified patent and that said Letters Patent are hereby corrected as shown below:

| | | |
|---|---|---|
| Column 2, | Line 55, | Only word on line "measure." should be cancelled and substitute therefore --- measured. ---; |
| Column 2, | Line 57, | At beginning of sentence before "highly" cancel "On" and substitute therefore --- One ---; |
| Column 2, | Line 58, | After "used" cancel "in" and substitute therefore --- is ---; |
| Column 5, | Line 32, | After "providing" cancel "effectively" and substitute therefore --- effective ---; |
| Column 7, | Line 2, | After "Although" cancel "no" and substitute therefore --- not ---; |
| Column 7, | Line 4, | After "on the" cancel "surface" and substitute therefore --- surfaces ---; |

UNITED STATES PATENT AND TRADEMARK OFFICE
CERTIFICATE OF CORRECTION

PATENT NO. : 4,265,117                                           Page 2 of 2
DATED      : May 5, 1981
INVENTOR(S): Paul E. Thoma, Louis J. Crum & Ronald J. Frias It is certified that error appears in the above-identified patent and that said Letters Patent are hereby corrected as shown below:

Column 7, Line 67,   After "of" cancel "cupchaped" and substitute therefore --- cup-shaped ---;

Column 6, Line 42,   After "material" cancel "19" and substitute therefore --- 29 ---;

Column 6, Line 58,   After "housing" insert --- 12 ---.

Signed and Sealed this

Seventeenth Day of November 1981

[SEAL]

Attest:

GERALD J. MOSSINGHOFF

Attesting Officer    Commissioner of Patents and Trademarks